(12) United States Patent
Takahashi et al.

(10) Patent No.: US 11,653,804 B2
(45) Date of Patent: May 23, 2023

(54) WORK SYSTEM, AUTONOMOUS WORK MACHINE, METHOD OF CONTROLLING AUTONOMOUS WORK MACHINE, AND NON-TRANSITORY COMPUTER-READABLE STORAGE MEDIUM

(71) Applicant: HONDA MOTOR CO., LTD., Tokyo (JP)

(72) Inventors: Hiroto Takahashi, Wako (JP); Yoshiaki Kotani, Wako (JP); Naoki Kameyama, Wako (JP); Hiroya Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 497 days.

(21) Appl. No.: 17/012,550

(22) Filed: Sep. 4, 2020

(65) Prior Publication Data
US 2021/0085143 A1   Mar. 25, 2021

(30) Foreign Application Priority Data
Sep. 19, 2019 (JP) .............................. JP2019-170765

(51) Int. Cl.
*A47L 9/28* (2006.01)
*G05D 1/02* (2020.01)

(52) U.S. Cl.
CPC .......... *A47L 9/2815* (2013.01); *A47L 9/2826* (2013.01); *G05D 1/0219* (2013.01); *G05D 1/0287* (2013.01); *A47L 2201/06* (2013.01); *G05D 2201/0203* (2013.01)

(58) Field of Classification Search
CPC .. A47L 9/2815; A47L 9/2826; A47L 2201/06; G05D 1/0219; G05D 1/0287; G05D 2201/0203
See application file for complete search history.

(56) References Cited

U.S. PATENT DOCUMENTS

| | | | |
|---|---|---|---|
| 2016/0339879 A1* | 11/2016 | Hirata | ..................... B60S 3/042 |
| 2017/0220044 A1* | 8/2017 | Sakai | ................... G05D 1/0219 |
| 2019/0212752 A1* | 7/2019 | Fong | ................... G05D 1/0274 |
| 2021/0008603 A1* | 1/2021 | Takahashi | ............... B08B 1/001 |

FOREIGN PATENT DOCUMENTS

| | | | | |
|---|---|---|---|---|
| JP | 2017173969 A | * | 9/2017 | ........... A01B 69/008 |
| JP | 2017173969 A | | 9/2017 | |

* cited by examiner

*Primary Examiner* — Marc Carlson
(74) *Attorney, Agent, or Firm* — Thomas | Horstemeyer, LLP

(57) ABSTRACT

A work system comprising a first autonomous work machine and a second autonomous work machine, wherein the first autonomous work machine includes: a detection unit configured to detect dirt on the second autonomous work machine; and a notification unit configured to, if the detection unit detects dirt, notify the second autonomous work machine of dirt information indicating the detection of the dirt, and the second autonomous work machine removes the dirt or waits in a predetermined position in response to the notification of the dirt information by the notification unit.

17 Claims, 11 Drawing Sheets

GUIDING METHOD 2
- NORMAL WORK VEHICLE EMITS POSITION INFORMATION OF WORK VEHICLE WITH DIRT
- FOLLOW NORMAL WORK VEHICLE

GUIDING METHOD 3
- NORMAL WORK VEHICLE EMITS POSITION INFORMATION OF WORK VEHICLE WITH DIRT
- LEAD WITH NORMAL WORK VEHICLE

FIG. 13
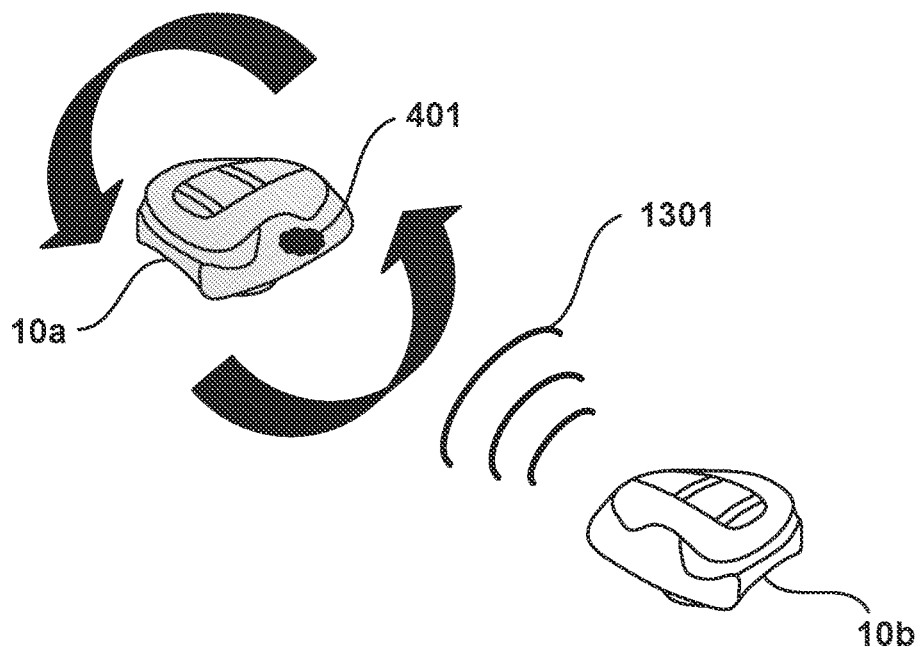
FIG. 14
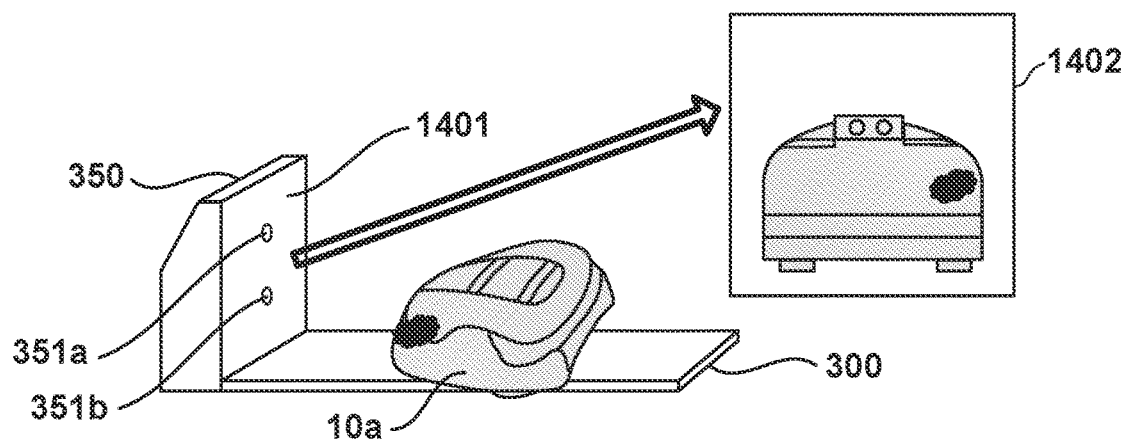
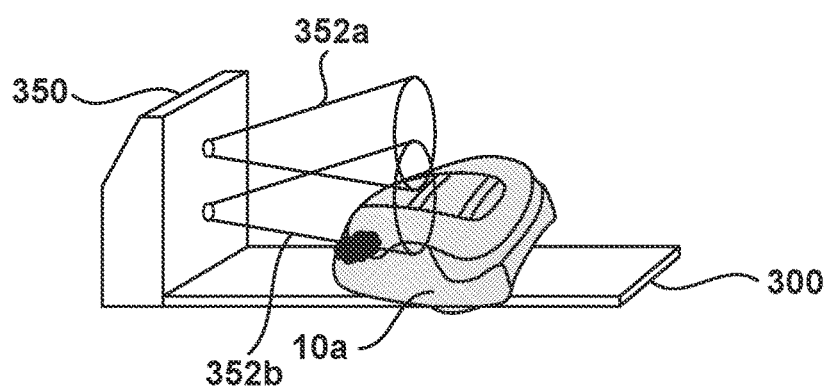

WORK SYSTEM, AUTONOMOUS WORK MACHINE, METHOD OF CONTROLLING AUTONOMOUS WORK MACHINE, AND NON-TRANSITORY COMPUTER-READABLE STORAGE MEDIUM

CROSS-REFERENCE TO RELATED APPLICATION(S)

This application claims priority to and the benefit of Japanese Patent Application No. 2019-170765 filed on Sep. 19, 2019, the entire disclosure of which is incorporated herein by reference.

BACKGROUND OF THE INVENTION

Field of the Invention

The present invention relates to a work system, an autonomous work machine, a method of controlling the autonomous work machine, and a non-transitory computer-readable storage medium.

Description of the Related Art

Japanese Patent Laid-Open No. 2017-173969 discloses an autonomous traveling system that autonomously travels based on an image captured by a camera.

In this technique described in Japanese Patent Laid-Open No. 2017-173969, however, removing dirt sticking to a work machine takes labor because the user must perform the removing work by monitoring the work machine and visually finding dirt.

The present invention has been made with the recognition of the above problem as a trigger, and provides a technique for facilitating the work of removing dirt sticking to the work machine.

SUMMARY OF THE INVENTION

According to one aspect of the present invention, there is provided a work system comprising a first autonomous work machine and a second autonomous work machine, wherein the first autonomous work machine includes: a detection unit configured to detect dirt on the second autonomous work machine; and a notification unit configured to, if the detection unit detects dirt, notify the second autonomous work machine of dirt information indicating the detection of the dirt, and the second autonomous work machine removes the dirt or waits in a predetermined position in response to the notification of the dirt information by the notification unit.

BRIEF DESCRIPTION OF THE DRAWINGS

The accompanying drawings, which are incorporated in and constitute a part of the specification, illustrate embodiments of the invention and, together with the description, serve to explain the invention.

FIG. 13 is a view for explaining the dirt checking operation according to the first embodiment; and FIG. 14 is a view showing the way a work vehicle is cleaned according to the second embodiment.

DESCRIPTION OF THE EMBODIMENTS

Figure 1:
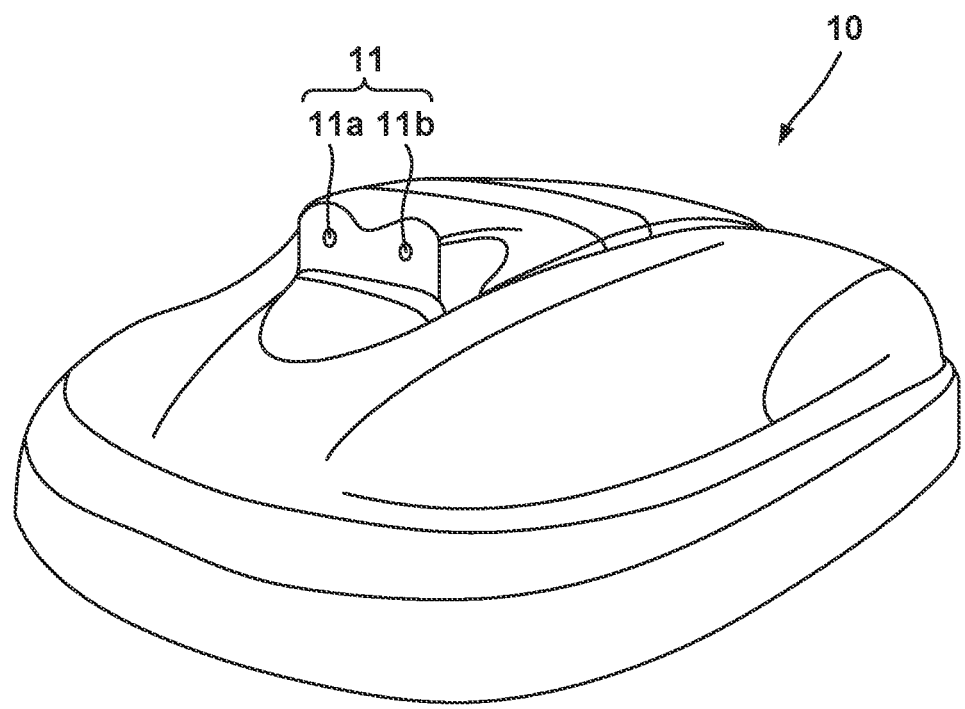
FIG. 1 is a view showing the outer appearance of a work machine capable of autonomous traveling according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a view showing the outer appearance of an autonomous work machine capable of autonomous traveling according to an embodiment of the present invention. In the following description, the traveling direction (vehicle longitudinal direction) of the autonomous work machine in a side view, a lateral direction (vehicle width direction) perpendicular to the traveling direction, and a perpendicular direction perpendicular to the traveling direction and the lateral direction are respectively defined as a front-and-rear direction, a left-and-right direction, and a vertical direction, and the arrangement of each component will be explained in accordance with these directions.

<Arrangement of Autonomous Work Machine>

Figure 2:
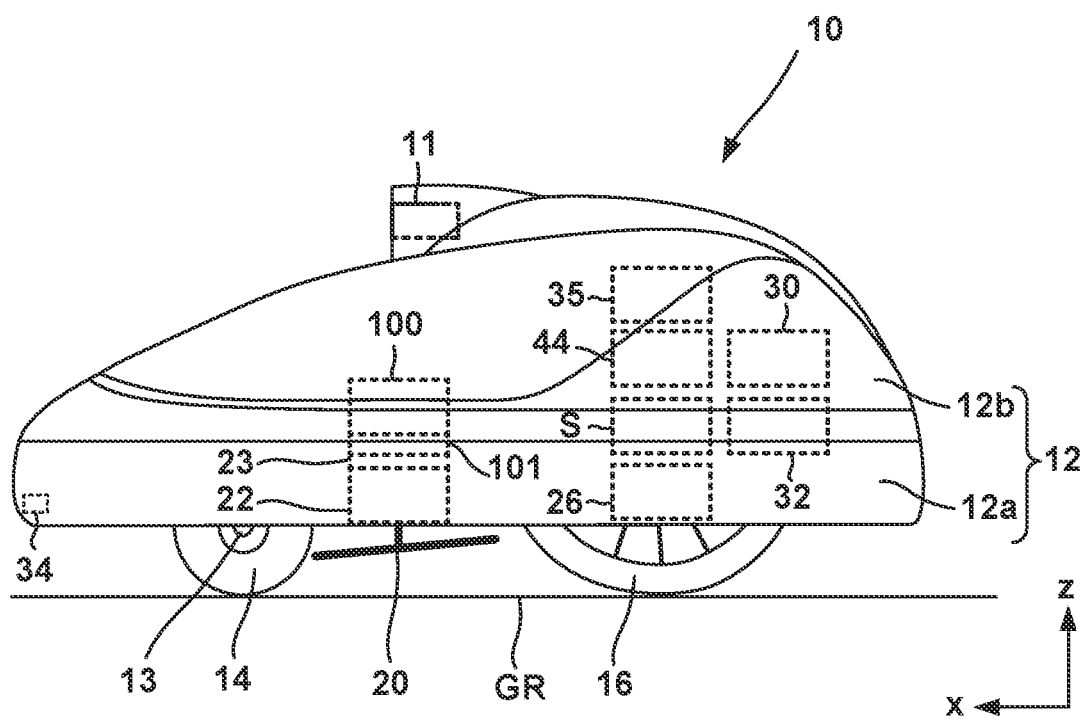
FIG. 2 is a view observing the work machine according to the embodiment of the present invention sideways.

In FIG. 1, reference numeral 10 denotes an autonomous work machine (to be referred to as "a work vehicle" hereinafter). More specifically, the work vehicle 10 functions as an autonomous traveling lawn mower. However, the lawn mower is merely an example, and the present invention is also applicable to other types of work vehicles. The work vehicle 10 has a camera unit 11 including a plurality of cameras (a first camera 11a and a second camera 11b), and calculates and obtains information of the distance between the work vehicle 10 and an object existing in front of the work vehicle 10 by using images captured by the first and second cameras 11a and 11b having a parallax. The operation of the work vehicle 10 is controlled based on the captured images and an object recognition model held in advance. Note that the work vehicle 10 may also include a sensor unit such as a LIDAR (Light Detection And Ranging) irradiation unit in addition to or in place of the camera unit 11, FIG. 2 is a view observing the work vehicle 10 in the lateral direction (vehicle width direction). As shown in FIG. 2, the work vehicle 10 includes the camera unit 11, a vehicle body 12, a stay 13, front wheels 14, rear wheels 16, a blade 20, a work motor 22, a motor holding member 23, a blade height adjustment motor 100, and a translation mechanism 101. The work vehicle 10 also includes traveling motors 26, various sensors S, an ECU (Electronic Control Unit) 44, a charging unit 30, a battery 32, a charging terminal 34, and a communication unit 35.

The vehicle body 12 of the work vehicle 10 includes a chassis 12a and a frame 12b attached to the chassis 12a. The front wheels 14 are two, left and right small-diameter wheels fixed to the front part of the chassis 12a via the stay 13. The rear wheels 16 are two, left and right large-diameter wheels attached to the rear part of the chassis 12a.

The blade 20 is a lawn mowing rotary blade attached near the central position of the chassis 12a. The work motor 22 is an electric motor arranged above the blade 20. The blade 20 is connected to and rotated by the work motor 22. The motor holding member 23 holds the work motor 22. The rotation of the motor holding member 23 is regulated with respect to the chassis 12a. In addition, the vertical movement of the motor holding member 23 is permitted by a combination of a guide rail and a slider capable of vertically moving by being guided by the guide rail.

The blade height adjustment motor 100 is a motor for adjusting the height of the blade 20 in the vertical direction from a ground surface GR. The translation mechanism 101 is connected to the blade height adjustment motor 100, and converts the rotation of the blade height adjustment motor 100 into a vertical translational movement. The translation mechanism 101 is also connected to the motor holding member 23 for holding the work motor 22.

The rotation of the blade height adjustment motor 100 is converted into the translational movement (vertical movement) by the translation mechanism 101, and this translational movement is transmitted to the motor holding member 23. The translational movement (vertical movement) of the motor holding member 23 causes the work motor 22 held by the motor holding member 23 to translationally move (vertically move). The height of the blade 20 from the ground surface GR can be adjusted by the vertical movement of the work motor 22.

The traveling motors 26 are two electric motors (motors) attached to the chassis 12a of the work vehicle 10. The two electric motors are connected to the left and right rear wheels 16. The left and right wheels are independently rotated forward (rotated in an advancing direction) or rotated backward (rotated in a retreating direction) by using the front wheels 14 as driven wheels and the rear wheels 16 as driving wheels. This allows the work vehicle 10 to move in various directions.

The charging terminal 34 is a charging terminal installed in the front end position of the frame 12b in the front-and-rear direction. The charging terminal 34 can receive power from a charging station (for example, a charging station 300 to be described later with reference to FIG. 3) when connected to a corresponding terminal of the charging station.

The charging terminal 34 is connected to the charging unit 30 by a line, and the charging unit 30 is connected to the battery 32. The work motor 22, the traveling motors 26, and the blade height adjustment motor 100 are also connected to the battery 32, and receive power from the battery 32.

The ECU 44 is an electronic control unit including a microcomputer formed on a circuit board, and controls the operation of the work vehicle 10. Details of the ECU 44 will be described later. The communication unit 35 can exchange information with an external apparatus (for example, the charging station or a cleaning apparatus (to be described later)) connected to the work vehicle 10 by wired or wireless connection. The communication unit 35 can also exchange information with a work vehicle other than the work vehicle 10.

Figure 3:
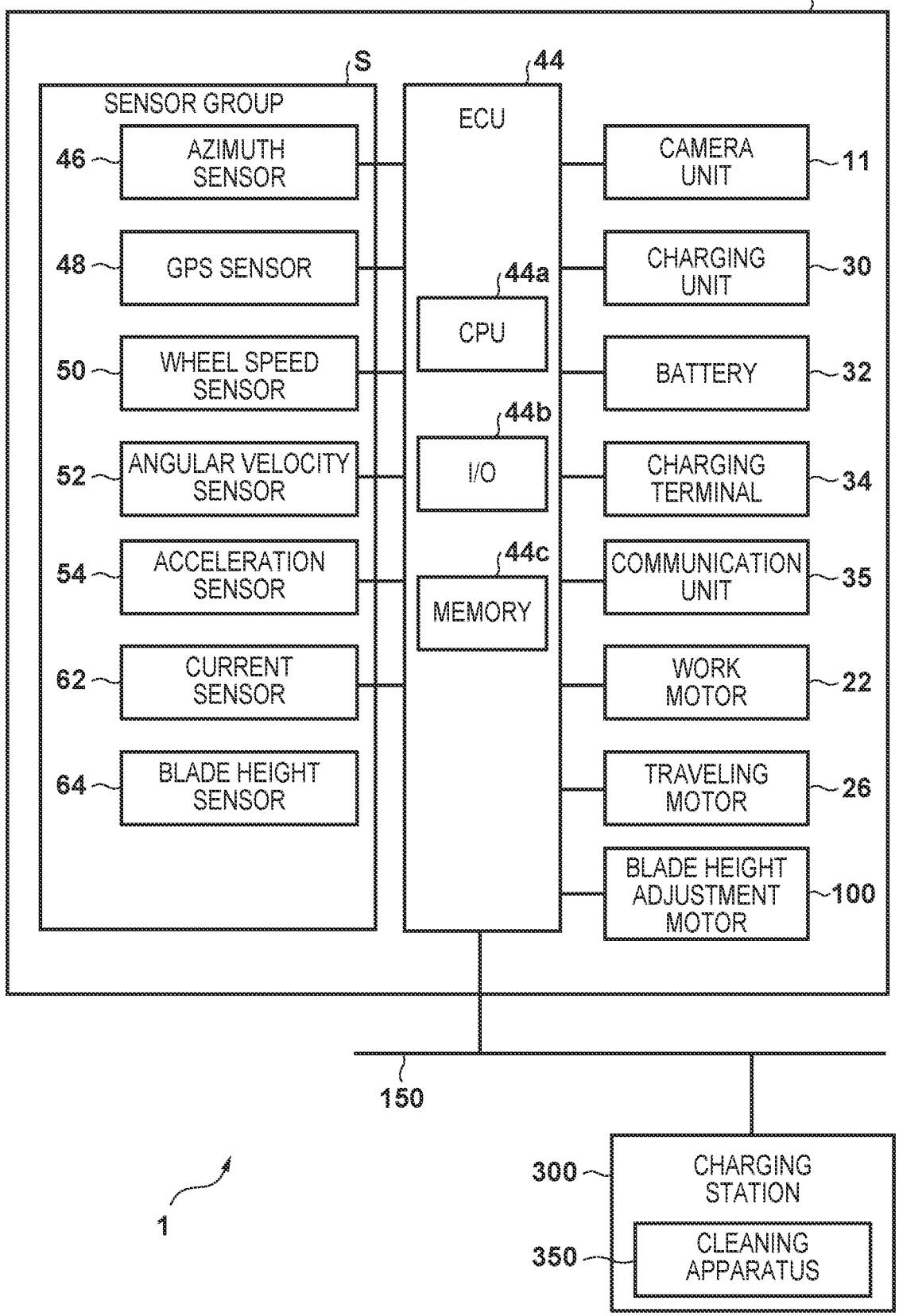
FIG. 3 is a view showing a configuration example of a work system including a work machine according to the first embodiment.

FIG. 3 is a view showing a configuration example of a work system according to the embodiment of the present invention. A work system 1 includes a plurality of work vehicles 10, and can further include the charging station 300.

As shown in FIG. 3, the ECU 44 of each work vehicle 10 includes a CPU 44a, an I/O 44b, and a memory 44c. The I/O 44b inputs and outputs various kinds of information. The memory 44c is, for example, a ROM (Read Only Memory), an EEPROM (Electrically Erasable Programmable Read Only Memory), or a RAM (Random Access Memory). The memory 44c stores captured images, the work schedule of the work vehicle 10, map information on the work area, and various programs for controlling the operation of the work vehicle 10. The ECU 44 can operate as each processing unit for implementing the present invention by reading out and executing a program stored in the memory 44c.

The ECU 44 is connected to the various sensors S. The sensors S include an azimuth sensor 46, a GPS sensor 48, a wheel speed sensor 50, an angular velocity sensor 52, an acceleration sensor 54, a current sensor 62, and a blade height sensor 64.

The azimuth sensor 46 and the GPS sensor 48 are sensors for obtaining information of the direction and the position of the work vehicle 10. The azimuth sensor 46 detects the azimuth corresponding to the terrestrial magnetism. The GPS sensor 48 receives radio waves from GPS satellites and detects information indicating the current position (the latitude and the longitude) of the work vehicle 10. Note that the ECU 44 may also include an odometry or an IMU (Inertial Measurement Unit) in addition to or in place of the GPS sensor 48 and the azimuth sensor 46.

The wheel speed sensor 50, the angular velocity sensor 52, and the acceleration sensor 54 are sensors for obtaining information on the moving state of the work vehicle 10. The wheel speed sensor 50 detects the wheel speeds of the left and right wheels 16. The angular velocity sensor 52 detects the angular velocity around the vertical axis e z-axis in the perpendicular direction) in the barycentric position of the work vehicle 10. The acceleration sensor 54 detects accelerations in the directions of three perpendicular axes, that is, the x-, y-, and z-axes, which act on the work vehicle 10.

The current sensor 62 detects the current consumption (power consumption) of the battery 32. The detection result of the current consumption (power consumption) is saved in the memory 44c of the ECU 44. When a predetermined power amount is consumed and the power amount stored in the battery 32 becomes equal to or lower than a threshold value, the ECU 44 performs return control for returning the work vehicle 10 to the charging station 300 in order to charge the work vehicle 10.

The blade height sensor 64 detects the height of the blade 20 from the ground surface GR. The blade height sensor 64 outputs the detection result to the ECU 44. Under the control of the ECU 44, the blade height adjustment motor 100 is driven, and the blade 20 vertically moves, thereby adjusting the height from the ground surface GR.

The outputs from the various sensors S are input to the ECU 44 via the I/O 44*b*. Based on the outputs from the various sensors S, the ECU 44 supplies power from the battery 32 to the traveling motor 26, the work motor 22, and the height adjusting motor 100. The ECU 44 controls the traveling motor 26 by outputting a control value via the I/O 44*b*, thereby controlling traveling of the work vehicle 10. The ECU 44 also controls the height adjusting motor 100 by outputting a control value via the I/O 44*b*, thereby controlling the height of the blade 20. Furthermore, the ECU 44 controls the work motor 22 by outputting a control value via the I/O 44*b*, thereby controlling the rotation of the blade 20. The I/O 44*b* can function as a communication interface, and can be connected to another apparatus across a network 150 by wired or wireless connection.

The charging station 300 functions as a charging apparatus for charging the battery (the battery 32) of the work vehicle 10, and is installed in the work area. The work vehicle 10 can be charged by returning to the charging station 300 and connecting the charging terminal 34 to the charging station 300. Also, the charging station 300 includes a cleaning apparatus 350, and hence has a cleaning function of cleaning the work vehicle 10 in addition to the charging function. The cleaning apparatus 350 can remove dirt by discharging water from above or sideways, or upward from the ground, toward the work vehicle 10 having stopped in a predetermined position or the like, thereby cleaning the upper portion, the side portions and/or the bottom portion of the work vehicle 10.

<Cleaning Process>

In this embodiment, an example in which a plurality of work vehicles working in the same work area perform a cleaning process on a work vehicle to which dirt is sticking and remove the dirt in cooperation with each other will be explained.

Figure 4:
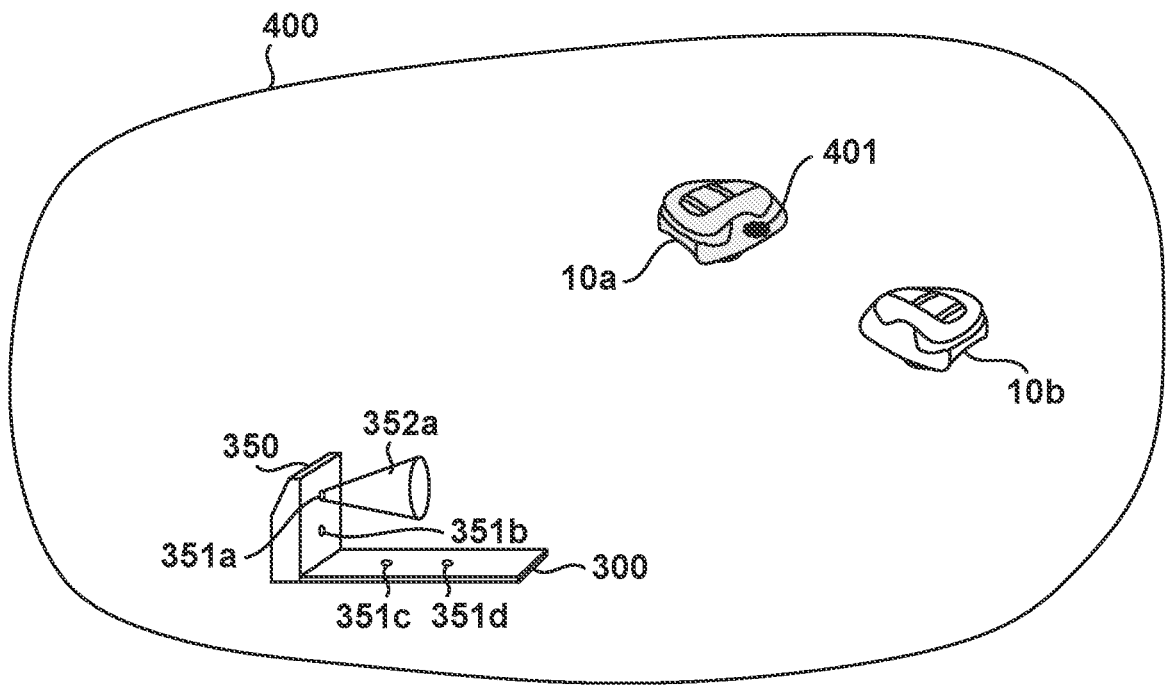
FIG. 4 is a view showing an example of the outer appearance of a work area including a plurality of work vehicles and a charging station (cleaning apparatus) according to the first embodiment.

FIG. 4 is a view showing an example of the outer appearance of the work area including the plurality of work vehicles and the charging station (the cleaning apparatus) according to this embodiment.

A work area 400 is defined by an area wire or the like. Work vehicles 10*a* and 10*b* perform works in the work area 400. Each work vehicle performs a work so as not to depart from the work area by detecting a magnetic field generated from the area wire. Note that this example shown in FIG. 4 depicts the two work vehicles, but the number of work vehicles need not be two and can be three or more.

Reference numeral 300 denotes the charging station. When the battery (the battery 32) becomes insufficient, each of the work vehicles 10*a* and 10*b* can charge itself by returning to the charging station 300. In this embodiment, the charging station 300 can also function as the cleaning apparatus 350, and can clean the work vehicle 10 having returned to the charging station 300.

A water discharge port 351*a* sprays water 352*a* against the work vehicle 10 having stopped in a predetermined position. Reference numerals 351*b* to 351*d* also denote water discharge ports. The water discharge port 351*a* is a water discharge port for cleaning the upper portions of the side portions of the work vehicle 10. The water discharge port 351*b* is a water discharge port for cleaning the lower portions of the side portions of the work vehicle. The water discharge ports 351*c* and 351*d* are water discharge ports for cleaning the bottom portion of the work vehicle 10.

Note that the positions of the water discharge ports are not limited to those of the example shown in FIG. 4. The water discharge ports can be so arranged as to surround the side portions of the work vehicle 10 having stopped in the predetermined position, and can also be formed in a ceiling by forming a roof above the predetermined position. The layout of the water discharge ports can be any layout as long as at least one of the upper surface, the side surfaces, and the lower surface (bottom surface) of the work vehicle 10 can be cleaned.

In this example shown in FIG. 4, it is assumed that the work vehicle 10*b* captures an image of the work vehicle 10*a* and detects dirt sticking to the work vehicle 10*a* by analyzing the image capturing result (the captured image). In this case, the work vehicle 10*b* notifies the work vehicle 10*a* of dirt information indicating that dirt is detected. This dirt information notification method is performed by wireless communication using the communication unit 35. However, the method is not limited to wireless communication. For example, it is also possible to install a light emitting unit (light) such as an LED (Light Emitting Diode) on the work vehicle 10, and cause the work vehicle 10 to perform passing to another work vehicle so that the other work vehicle detects the passing light, thereby notifying the other work vehicle of the dirt information. The work vehicle 10*a* notified of the dirt information determines whether autonomous traveling is possible, and moves to the installation position of the cleaning apparatus 350 by itself if autonomous traveling is possible. When having arrived at the installation position, the work vehicle 10*a* instructs the cleaning apparatus 350 to perform a cleaning operation. This instruction can also be performed by wireless communication or passing using the light emitting unit (light). The cleaning apparatus 350 having received the instruction discharges the water 352 from the water discharge ports 351 and performs the cleaning process of removing dirt by spraying the water.

On the other hand, if the work vehicle 10*a* determines that autonomous traveling is impossible, the work vehicle 10*a* requests the work vehicle 10*b* to guide the work vehicle 10*a* to the installation position of the cleaning apparatus 350. This has the same meaning as the transmission of SOS. A case in which autonomous traveling is impossible is, for example, a case in which dirt or the like is sticking to the camera unit 11 of the work vehicle 10*a* so the work vehicle 10*a* cannot obtain information of the circumference. In response to the request from the work vehicle 10*a*, the work vehicle 10*b* guides the work vehicle 10*a* to the installation position of the cleaning apparatus 350. Details of the guiding method will be described later. The work vehicle 10*a* moves to the installation position of the cleaning apparatus 350 in accordance with the guidance by the work vehicle 10*b*. A cleaning process after the completion of the movement is the same as the above-described process.

<Operation Sequence>

Figure 5:
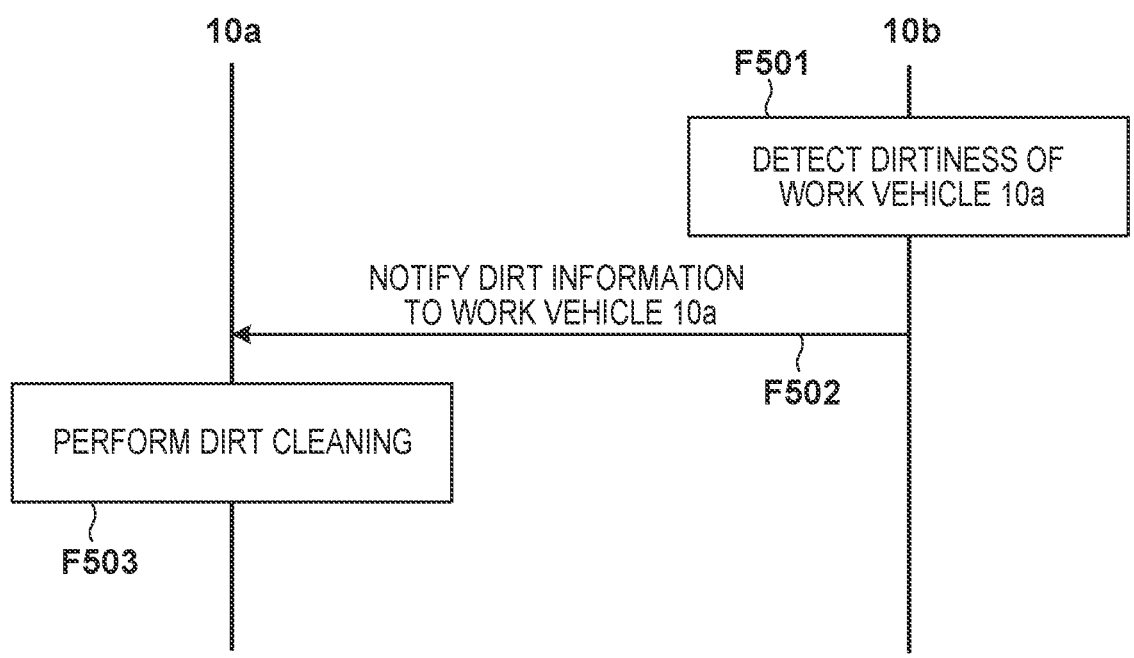
FIG. 5 is a view showing the operation sequence of the work system according to the embodiment of the present invention.

Next, an example of the operation sequence between work vehicles according to this embodiment will be explained below with reference to FIG. 5. In F501, the work vehicle 10*b* detects that dirt is sticking to the work vehicle 10*a*. In F502, the work vehicle 10*b* transmits dirt information indicating the detection of dirt to the work vehicle 10*a*, in F503, the work vehicle 10*a* cleans itself in response to the reception of the dirt information. For example, as described above, the work vehicle 10*a* moves to the installation position of the cleaning apparatus 350 by autonomous traveling or guidance and cleans itself by undergoing the cleaning process.

Figure 6:
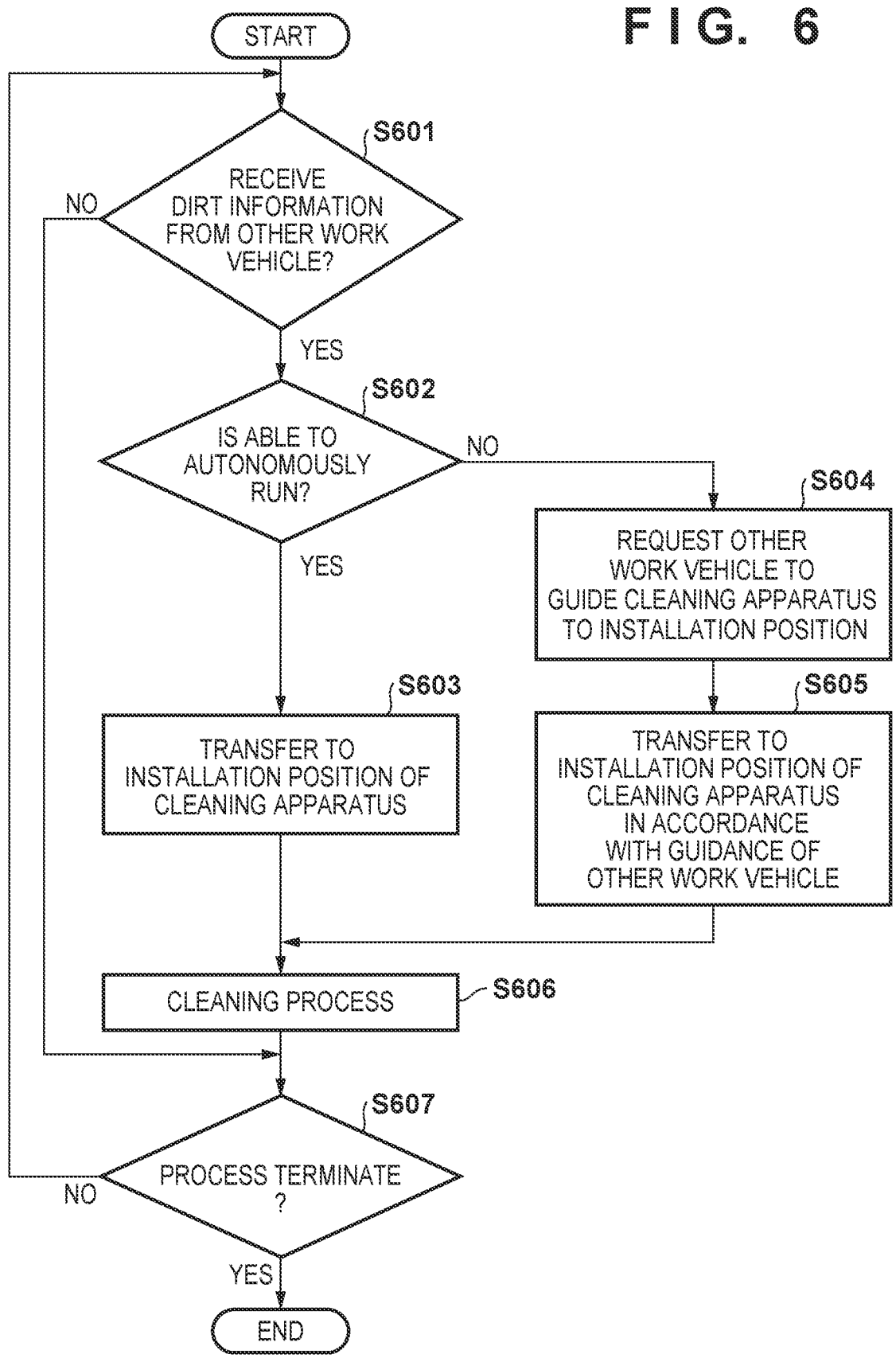
FIG. 6 is a flowchart showing a procedure to be performed by a work vehicle to which dirt is sticking according to the first embodiment.

FIG. 6 is a flowchart showing a procedure to be performed by a work vehicle to which dirt is sticking, according to this embodiment.

In step S601, the CPU 44a determines whether dirt information is received from another work vehicle. If dirt information is received, the procedure advances to step S602. If no dirt information is received, the procedure advances to step S607.

In step S602, the CPU 44a determines whether the self-vehicle is capable of autonomous traveling. For example, the CPU 44a analyzes an image captured by the camera unit 11 and discriminates the state of dirt on the camera unit 11. If the number of detected pixels (for example, black pixels) corresponding to dirt is equal to or larger than a predetermined number, such as when dirt is sticking to the lens of the camera unit 11, the CPU 44a can determine that autonomous traveling is impossible. If the CPU 44a determines that the self-vehicle is capable of autonomous traveling, the procedure advances to step S603. If the CPU 44a determines that the self-vehicle is incapable of autonomous traveling, the procedure advances to step S604.

In step S603, the CPU 44a performs control for moving the self-vehicle to the installation position of the cleaning apparatus 350. In step S604, the CPU 44a requests another work vehicle to guide the self-vehicle to the installation position of the cleaning apparatus 350 because the self-vehicle is incapable of autonomous traveling. In step S605, the CPU 44a performs control for moving the self-vehicle to the installation position of the cleaning apparatus 350 in accordance with the guidance by the other work vehicle.

In step S606, the CPU 44a accepts the cleaning process by the cleaning apparatus 350 after the self-vehicle has arrived at the installation position of the cleaning apparatus 350. Consequently, the dirt sticking to the self-vehicle can be removed. In addition, if the self-vehicle has been guided because it is incapable of autonomous traveling, the cleaning process in this step makes autonomous traveling possible.

In step S607, the CPU 44a determines whether to terminate the procedure. A case in which the procedure is terminated is, for example, a case in which the scheduled work is complete when the work schedule is referred to, or a case in which charging is necessary because the battery is insufficient. If the procedure is not to be terminated, the procedure returns to step S601.

According to the series of processes as explained above, it is possible to recognize that the self-vehicle is dirty by receiving dirt information from another work vehicle. Then, if the self-vehicle is incapable of autonomous traveling, the self-vehicle can request another work vehicle to guide the self-vehicle and can move to the installation position of the cleaning apparatus in accordance with the guidance by the other work vehicle.

This makes it possible to clean a work vehicle to which dirt is sticking, and automatically perform maintenance.

Figure 7:
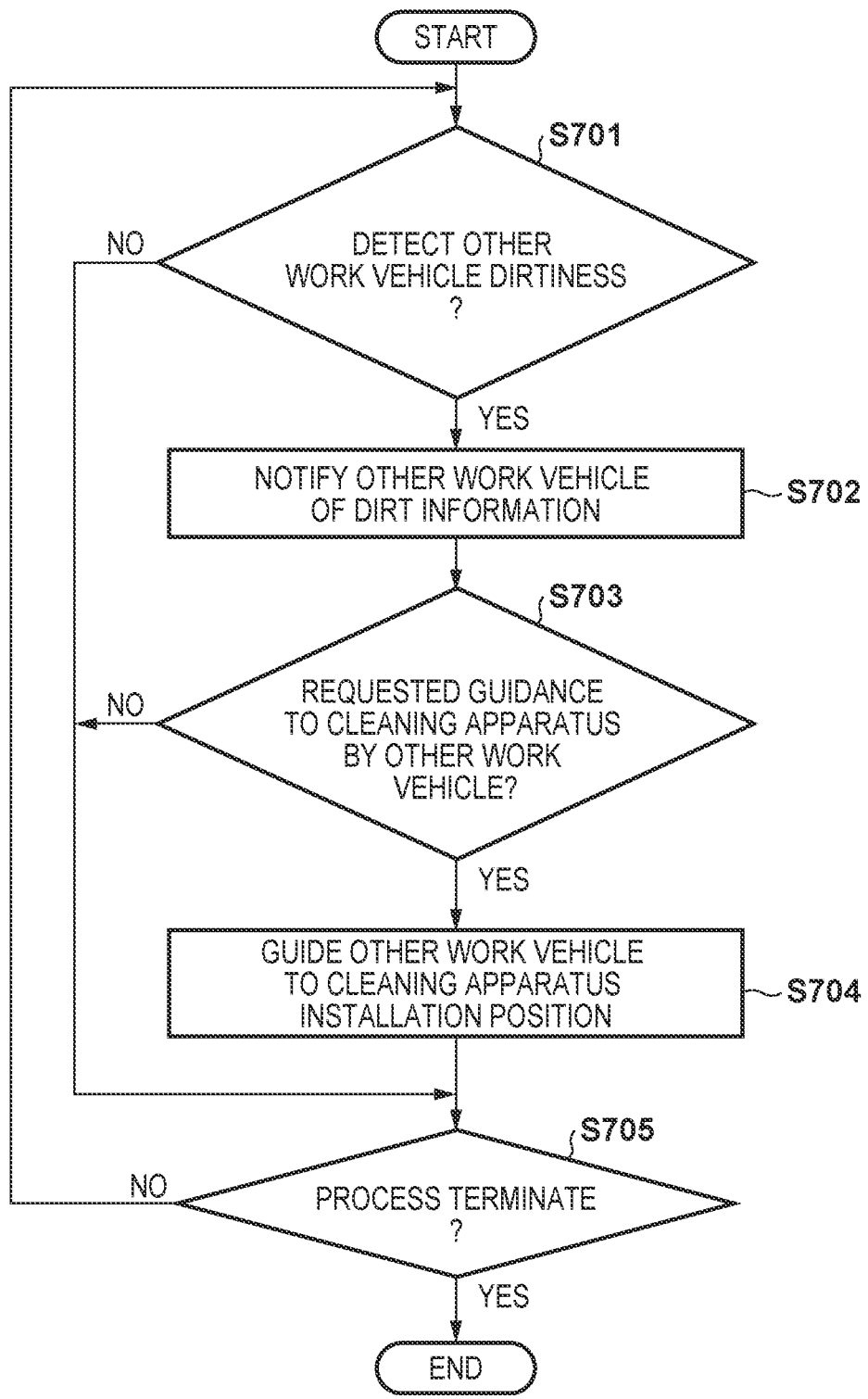
FIG. 7 is a flowchart showing a procedure to be performed by a work vehicle having found a work vehicle to which dirt is sticking according to the first embodiment.

FIG. 7 is a flowchart showing a procedure to be performed by a work vehicle having found a work vehicle to which dirt is sticking, according to this embodiment.

In step S701, the CPU 44a determines whether dirt on another work vehicle is detected. Details of the dirt detection method will be described later with reference to FIG. 8. If dirt is detected, the procedure advances to step S702. If no dirt is detected, the procedure advances to step S705.

In step S702, the CPU 44a notifies the other work vehicle of dirt information indicating the detection of dirt. In step S703, the CPU 44a determines whether the other work vehicle has requested guidance to the cleaning apparatus 350. If the other work vehicle has requested guidance, the procedure advances to step S704. If the other work vehicle has not requested guidance, the procedure advances to step S705. For example, if there is no request even after a predetermined time has elapsed, it is possible to determine that no guidance is requested.

In step S704, the CPU 44a guides the other work vehicle to the installation position of the cleaning apparatus 350 in response to the request from the other work vehicle. Details of the guiding method will be described later. In step S705, the CPU 44a determines whether to terminate the procedure. If the procedure is not to be terminated, the procedure returns to step S701.

According to the series of processes as explained above, if dirt on another work vehicle is detected, it is possible to notify the other work vehicle of this information. If the other work vehicle is incapable of autonomous traveling, it is possible to guide the other work vehicle to the installation position of the cleaning apparatus in response to a request from the other work vehicle.

This makes it possible to clean the work vehicle to which dirt is sticking, and automatically perform maintenance.

Figure 8:
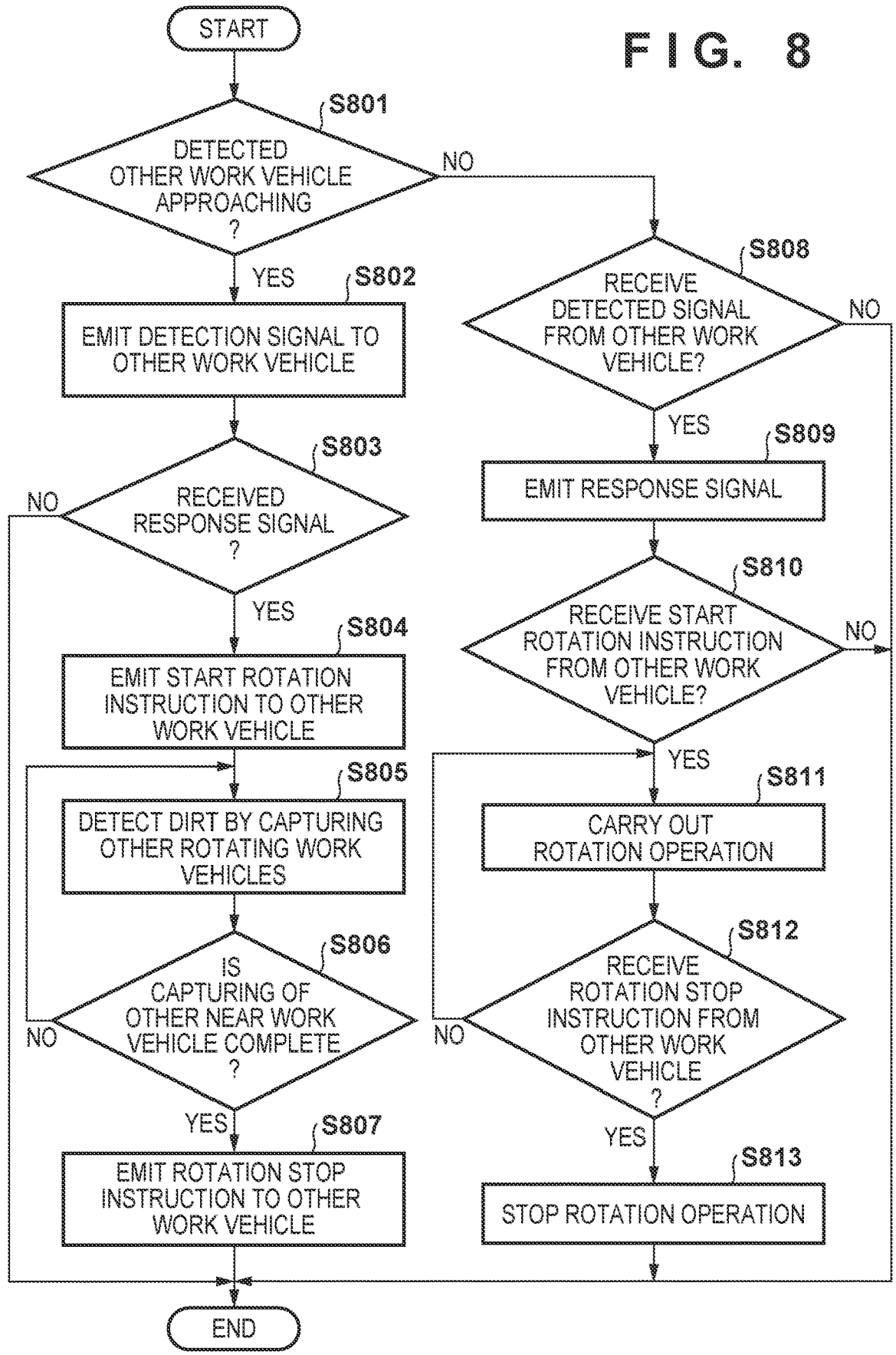
FIG. 8 is a flowchart showing the procedure of a dirt checking operation to be performed by a work vehicle according to the first embodiment.

FIG. 8 is a flowchart showing the procedure of a dirt checking operation to be performed by a work vehicle according to this embodiment.

In step S801, the CPU 44a determines whether approach to another work vehicle is detected. The approach to another work vehicle can be detected based on, for example, the distance to the other work vehicle, which is indicated by distance information obtained from a captured image of the other work vehicle. Alternatively, the detection can also be performed by receiving position information from the other work vehicle and comparing the position information with that of the self-vehicle. The approach can be detected if, for example, the distance between the other work vehicle and the self-vehicle is equal to or larger than a predetermined value. If the approach is detected, the procedure advances to step S802. If no approach is detected, the procedure advances to step S808.

In step S802, the CPU 44a transmits a detection signal indicating the detection of the approach to the other work vehicle. In step S803, the CPU 44a determines whether a response signal to the detection signal transmitted to the other work vehicle is received. If the response signal is received, the procedure advances to step S804. If no response signal is received even after the elapse of a predetermined time, the procedure is terminated.

In step S804, the CPU 44a transmits a signal indicating a turn start instruction to the other work vehicle. For example, as shown in FIG. 13, the work vehicle 10b transmits a signal 1301 to the work vehicle 10a. In step S805, the CPU 44a captures an image of the other work vehicle that is turning in response to the turn start instruction by the camera unit 11, and detects dirt on the other work vehicle by analyzing the captured image. In this example shown in FIG. 13, the work vehicle 10a turns, and the work vehicle 10b detects dirt by capturing an image of the turning work vehicle 10b by the camera unit 11.

In step S806, the CPU 44a determines whether image capturing of the circumference of the other turning work vehicle is complete. The CPU 44a waits until at least one turning operation is complete. If the image capturing is complete, the procedure advances to step S807. If the image capturing is not complete, the procedure returns to step S805, and the CPU 44a waits until the image capturing is complete. Note that if dirt is detected during the turning operation, the procedure may also advance to step S807 at that point of time.

In step S807, the CPU 44a transmits a signal indicating a turn stop instruction to the other work vehicle. Accordingly, the other work vehicle stops the turning operation. In this case, step S701 shown in FIG. 7 is Yes, so the procedure advances to step S702 and notifies dirt information. On the other hand, in step S808, the CPU 44a determines whether a detection signal indicating the detection of the approach of the self-vehicle is received from the other work vehicle. If the detection signal is received, the procedure advances to step S809. If no detection signal is received, the procedure is terminated.

In step S809, the CPU 44a transmits a response signal indicating the reception of the detection signal to the other work vehicle. In step S810, the CPU 44a determines, in accordance with the response signal, whether a signal indicating a turn start instruction is received from the other work vehicle. If the turn start instruction is received, the procedure advances to step S811. If no turn start signal is received even after the elapse of a predetermined time, the procedure is terminated.

In step S811, the CPU 44a executes a turning operation of turning the self-vehicle. During this turning operation, the other work vehicle detects dirt by capturing an image of the self-vehicle. In step S812, the CPU 44a determines whether a signal indicating a turn stop instruction is received from the other work vehicle. If the turn stop instruction is received, the procedure advances to step S813. If no turn stop instruction is received, the procedure returns to step S811, and the turning operation is continued. In step S813, the CPU 44a stops the turning operation of turning the self-vehicle. Thus, a series of processes are complete.

According to the series of processes as explained above, the dirt checking operation of detecting dirt on a work vehicle can be executed by using approach to another work vehicle as a trigger.

<Guiding Method>

Details of the guiding method of guiding a work vehicle incapable of autonomous traveling to the cleaning apparatus will now be explained.

[Guiding Method 1]

Figure 9:
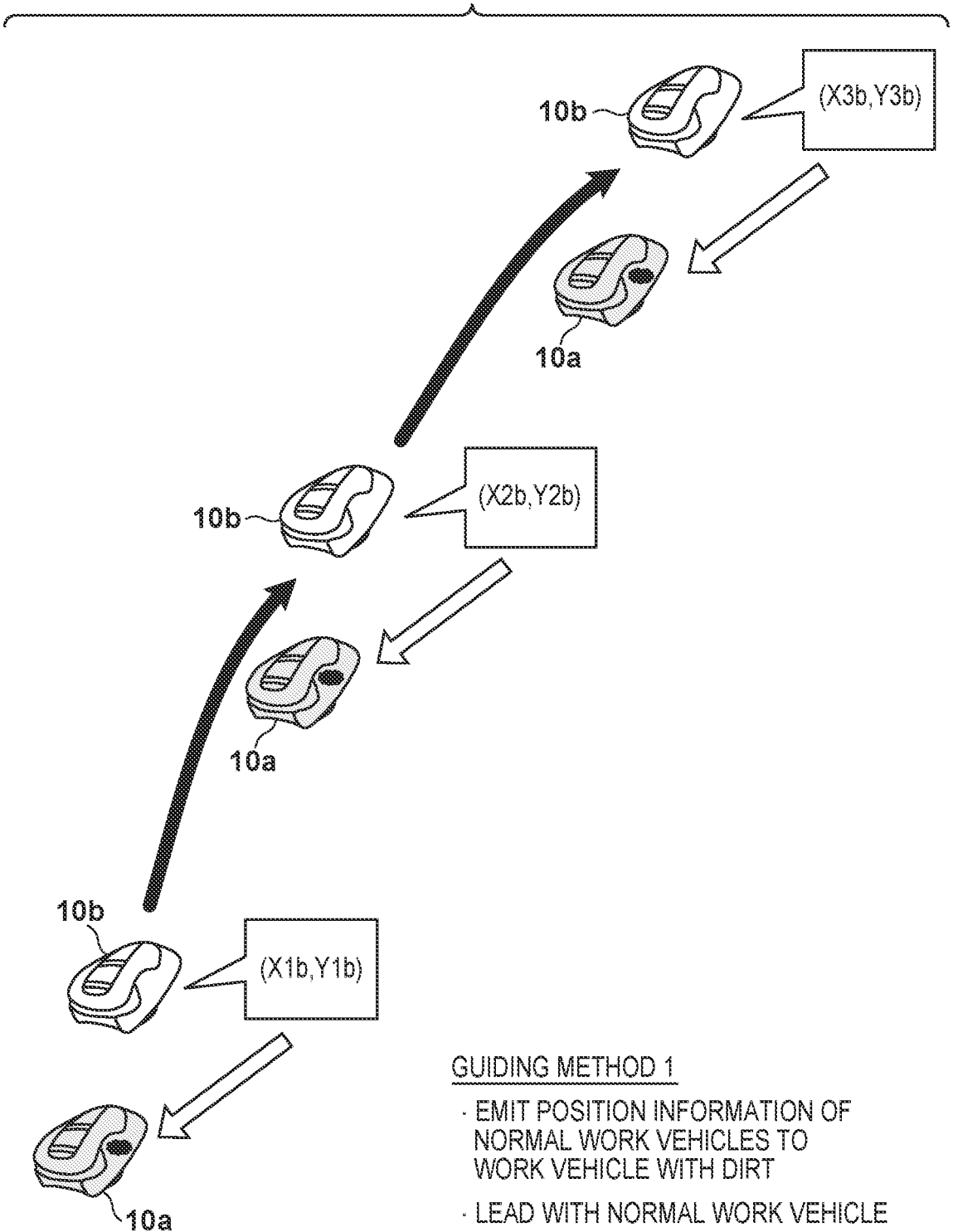
FIG. 9 is a view for explaining guiding method 1 according to the first embodiment.

FIG. 9 is a view for explaining guiding method 1 according to this embodiment. FIG. 9 shows an example in which the work vehicle 10b that has no dirt and is normal leads the work vehicle 10a incapable of autonomous traveling because dirt is sticking, while the normal work vehicle 10b is continuously transmitting position information of the work vehicle 10b to the work vehicle 10a incapable of autonomous traveling.

In this example shown in FIG. 9, the work vehicle 10b is guiding the work vehicle 10a from the lower left corner of the drawing surface to the upper right corner of the drawing surface. Since the work vehicle 10b can normally operate, the work vehicle 10b can travel based on images captured by the camera unit 11. While traveling toward the cleaning apparatus 350, the work vehicle 10b regularly transmits its position to the work vehicle 10a. In the example shown in FIG. 9, the work vehicle 10b first transmits information indicating its position (X1b, Y1b) to the work vehicle 10a. The work vehicle 10a moves toward the received position (X1b, Y1b) of the work vehicle 10b. In this case, the work vehicle 10a moves toward the position (X1b, Y1b) of the work vehicle 10b by using pre-held map information of the work area, the GPS sensor 48, and the azimuth sensor 46. Alternatively, the work vehicle 10a can also move by using an odometry and an inertial measurement unit (IMU), instead of the GPS sensor 48 and the azimuth sensor 46.

While the work vehicle 10a is moving toward the position (X1b, Y1b) of the work vehicle 10b, the work vehicle 10b is further moving toward the cleaning apparatus 350. Similarly, the work vehicle 10b transmits information indicating its position (X2b, Y2b) to the work vehicle 10a while moving. Then, the work vehicle 10a moves toward the position (X2b, Y2b). Furthermore, the work vehicle 10b transmits information indicating its position (X3b, Y3b) to the work vehicle 10a while moving. Then, the work vehicle 10a moves toward the position (X3b, Y3b). By repeating this, the work vehicle 10b guides the work vehicle 10a to the vicinity of the cleaning apparatus 350. When the work vehicle 10a enters a predetermined distance range from the cleaning apparatus 350, the work vehicle 10a moves to a predetermined position of the cleaning apparatus 350 based on a signal transmitted from the cleaning apparatus 350. Thus, the work vehicle 10a can move to the installation position of the cleaning apparatus 350.

As described above, the normal work vehicle 10b transmits the position information of the work vehicle 10b to the work vehicle 10a incapable of autonomous traveling because dirt is sticking to the camera unit 11, so the work vehicle 10a can roughly recognize its position. The work vehicle 10a can move to the installation position of the cleaning apparatus 350 in accordance with the guidance by the work vehicle 10b while estimating its own position by using the map information and the odometry or the like. Although the accuracy of self-position estimation is low because the camera unit 11 is not usable and the odometry or the like is used, the work vehicle 10a can move to the installation position of the cleaning apparatus 350 with the assistance (guidance) by the work vehicle 10b.

[Guiding Method 2]

Figure 10:
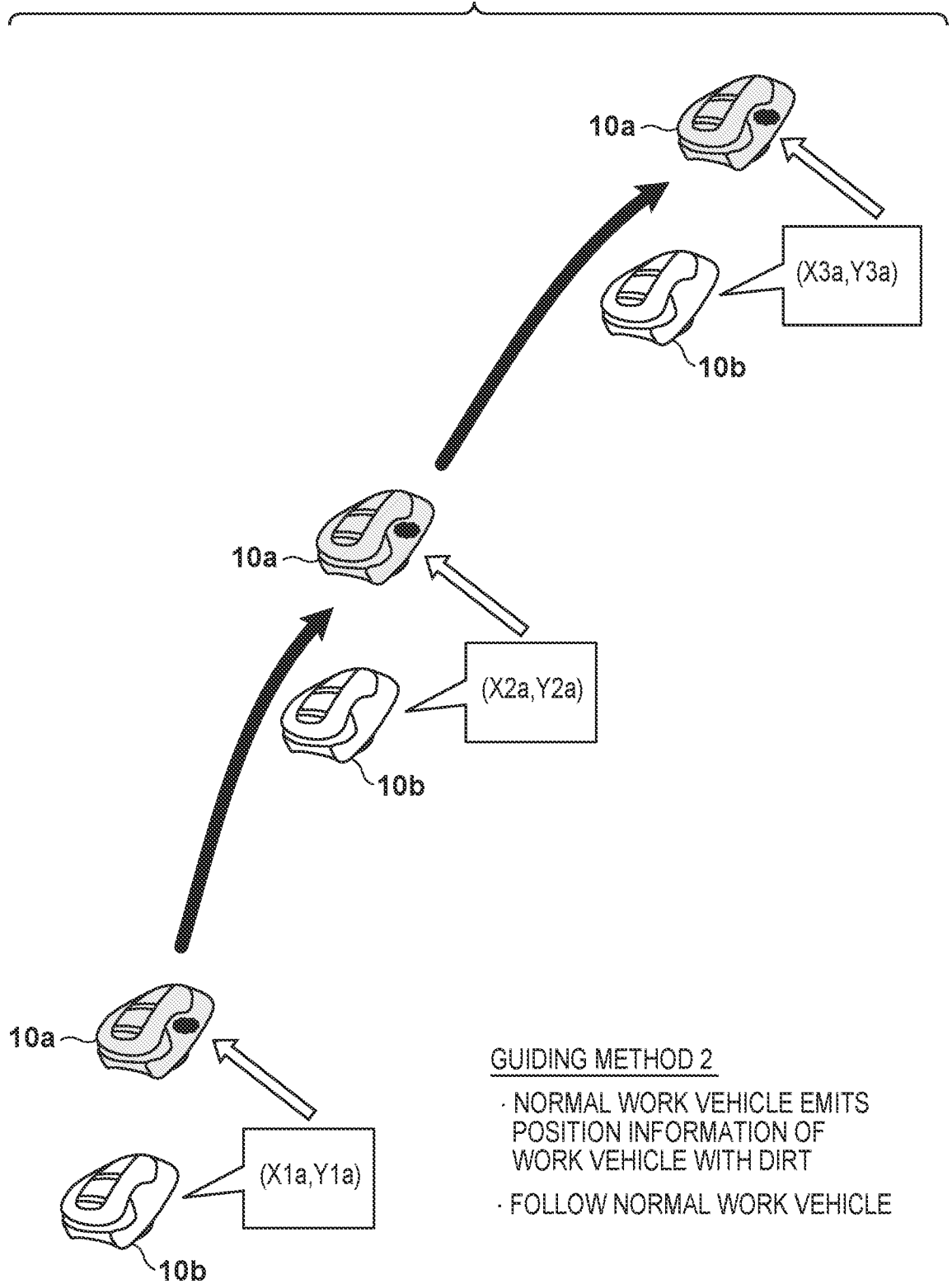
FIG. 10 is a view for explaining guiding method 2 according to the first embodiment.

FIG. 10 is a view for explaining guiding method 2 according to this embodiment. FIG. 10 shows an example in which the normal work vehicle 10b calculates position information of the work vehicle 10a incapable of autonomous traveling because dirt is sticking, and, while continuously transmitting the calculated position information to the work vehicle 10a, the normal work vehicle 10b guides the work vehicle 10a incapable of autonomous traveling to the installation position of the cleaning apparatus 350 by following the work vehicle 10a.

In this example shown in FIG. 10, the work vehicle 10b guides the work vehicle 10a from the lower left corner of the drawing surface to the upper right corner of the drawing surface. Since the work vehicle 10b can normally operate, the work vehicle 10b can autonomously travel based on an image captured by the camera unit 11. In addition, since the work vehicle 10b follows the work vehicle 10a, the work vehicle 10b can obtain information of the distance and azimuth from the work vehicle 10b to the work vehicle 10a based on the captured image containing the work vehicle 10a. The work vehicle 10b calculates position information of the work vehicle 10a based on position information of the self-vehicle obtained from the captured image and the information of the distance and azimuth to the work vehicle 10a. While following the work vehicle 10a, the work vehicle 10b regularly transmits the calculated position of the work vehicle 10a to the work vehicle 10a.

In the example shown in FIG. 10, the work vehicle 10b first transmits information indicating a calculated position (X1a, Y1a) of the work vehicle 10a to the work vehicle 10a. The work vehicle 10a moves toward the installation position of the cleaning apparatus 350 by using the received position (X1a, Y1a) of the work vehicle 10a and pre-held map information of the work area. Similarly, the work vehicle 10b repeatedly calculates positions (X2a, Y2a), (X3a, Y3a), . . . , of the work vehicle 10a and transmits the calculated positions to the work vehicle 10a while following the work vehicle 10a.

By repeating this, the work vehicle 10b guides the work vehicle 10a to the vicinity of the cleaning apparatus 350. When the work vehicle 10a enters a predetermined distance range from the cleaning apparatus 350, the work vehicle 10a moves to a predetermined position of the cleaning apparatus 350 based on a signal transmitted from the cleaning apparatus 350. Thus, the work vehicle 10a can move to the installation position of the cleaning apparatus 350.

As described above, the normal work vehicle 10b regularly calculates the position information of the work vehicle 10a incapable of autonomous traveling because dirt is sticking to the camera unit 11, and transmits the calculated position information to the work vehicle 10a, so the work vehicle 10a can accurately recognize its position. Accordingly, the work vehicle 10a can move to the installation position of the cleaning apparatus 350 in accordance with the guidance by the work vehicle 10b.

[Guiding Method 3]

Figure 11:
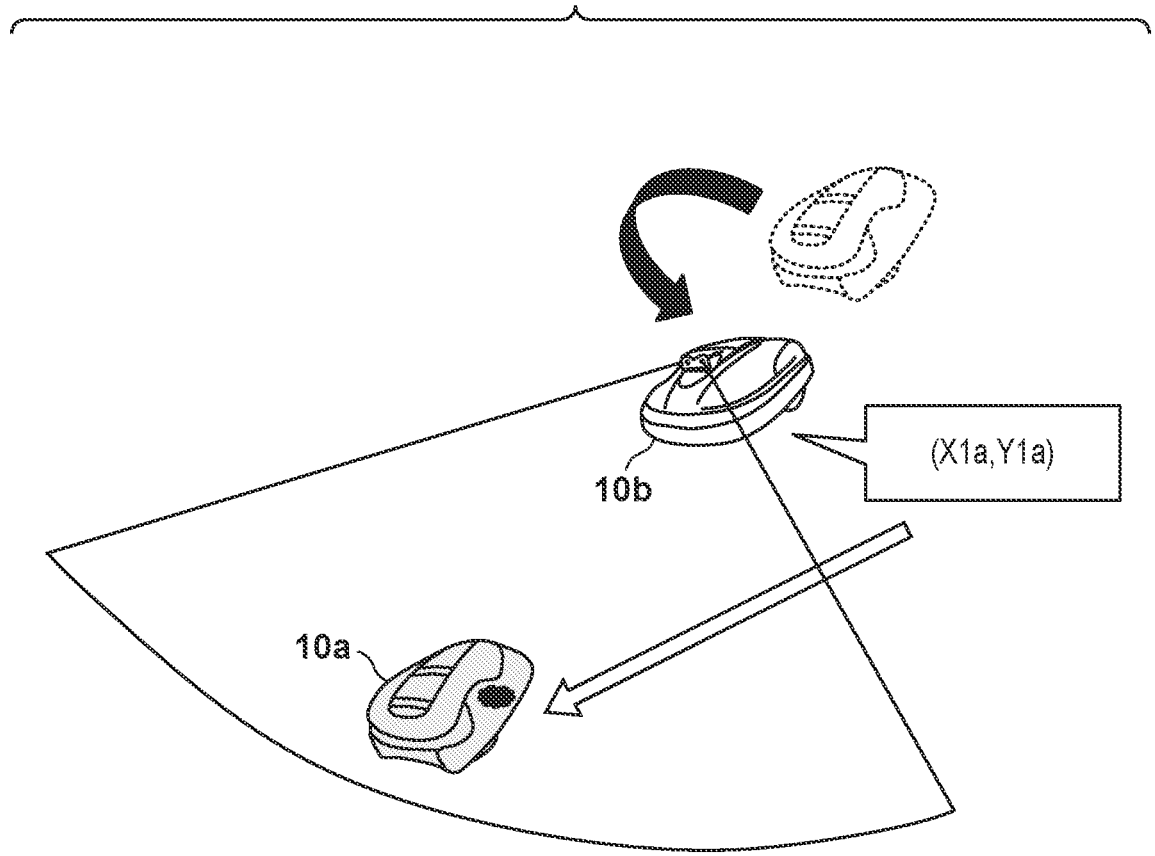
FIG. 11 is a view for explaining guiding method 3 according to the first embodiment.

FIG. 11 is a view for explaining guiding method 3 according to this embodiment. FIG. 11 shows an example in which the normal work vehicle 10b calculates position information of the work vehicle 10a incapable of autonomous traveling because dirt is sticking, and, while continuously transmitting the calculated position information to the work vehicle 10a, the normal work vehicle 10b leads the work vehicle 10a incapable of autonomous traveling.

Since the work vehicle 10b leads the work vehicle 10a, the work vehicle 10b regularly turns toward the following work vehicle 10a and captures an image of the work vehicle 10a. Then, the work vehicle 10b calculates the position of the work vehicle 10a based on position information of the self-vehicle and information of the distance and the azimuth to the work vehicle 10a, and transmits the calculated position of the work vehicle 10a to the work vehicle 10a. The difference from guiding method 2 is that the work vehicle 10b follows or leads the work vehicle 10a, and the rest is the same as guiding method 2. That is, the work vehicle 10a can move to the installation position of the cleaning apparatus 350 in accordance with the guidance by the work vehicle 10b.

[Guiding Method 4]

Figure 12:
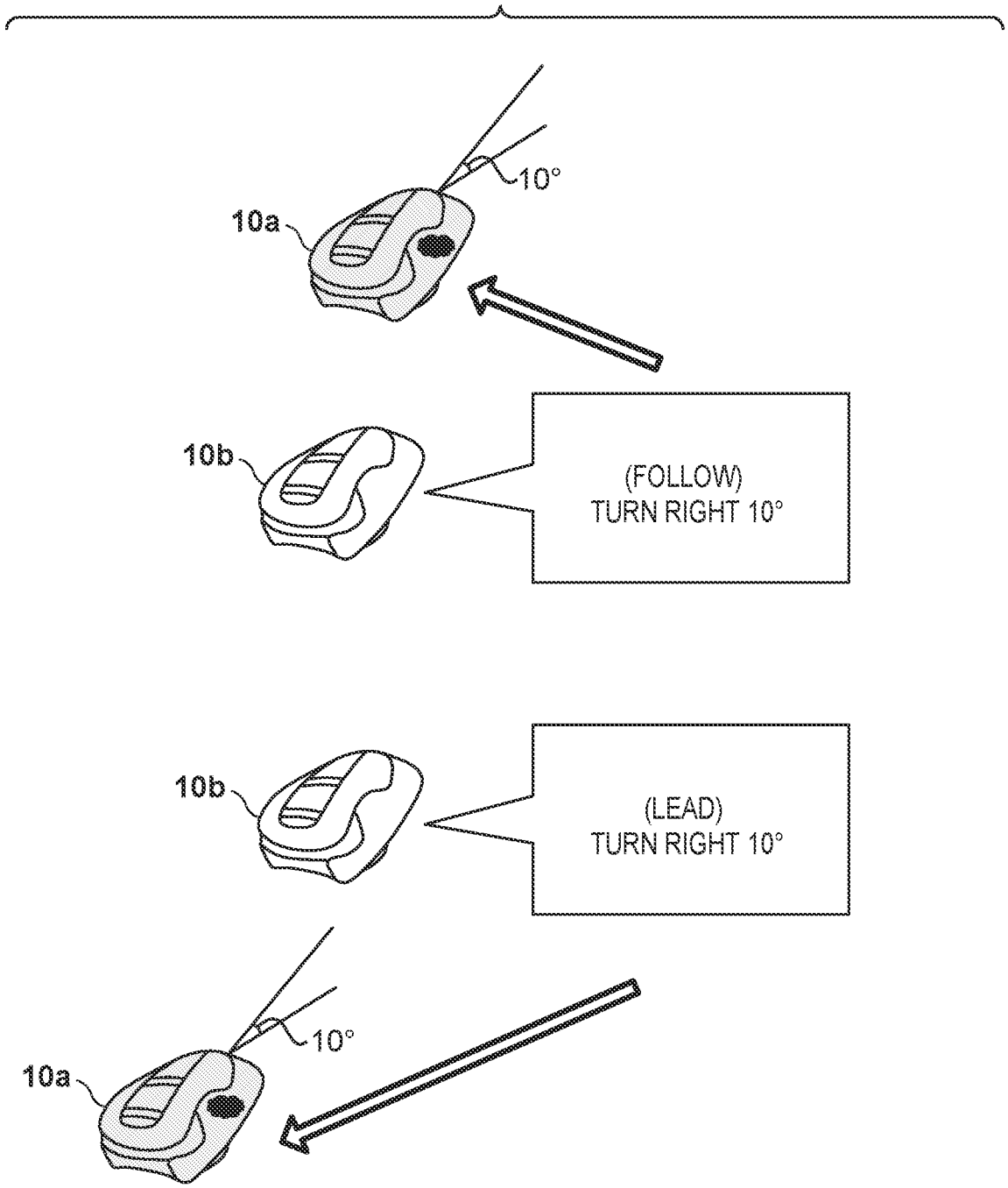
FIG. 12 is a view for explaining guiding method 4 according to the first embodiment.

FIG. 12 is a view for explaining guiding method 4 according to this embodiment. Guiding methods 1 to 3 show examples in which position information is notified. However, a normal work vehicle can also guide a work vehicle incapable of autonomous traveling because dirt is sticking, to the installation position of the cleaning apparatus 350 by transmitting the way of moving (for example, the moving direction).

In this example shown in FIG. 12, the normal work vehicle 10b transmits an instruction to the work vehicle 10a incapable of accurately recognizing its position due to dirt sticking to the camera unit 11. The normal work vehicle 10b obtains position information in the same manner as in guiding methods 1 and 2. After that, based on the obtained position information, the normal work vehicle 10b transmits an instruction such as "turn 10° to the right" to the work vehicle 10a. The work vehicle 10a having received this instruction travels in accordance with the instruction. The work vehicle 10b can transmit the instruction while either following or leading the work vehicle 10a. Note that when leading the work vehicle 10a, the work vehicle 10b transmits the instruction while regularly turning toward the work vehicle 10a and capturing an image of the work vehicle 10a in the same manner as in guiding method 3.

Thus, a work vehicle incapable of autonomous traveling can be guided to the installation position of the cleaning apparatus by transmitting the way of moving (for example, the moving direction), instead of transmitting the position information.

[Modifications]

In the first embodiment, an example in which a work vehicle to which dirt is sticking moves to the installation position of the cleaning apparatus and undergoes the cleaning process has been explained. However, the present invention is not limited to this example. For example, it is also possible to install a water storage tank in each work vehicle, and give each work vehicle a function of discharging water stored in the water storage tank so that the work vehicle can clean other work vehicles. In this case, each work vehicle can be cleaned, without moving to the installation position of the cleaning apparatus, by water discharged from another work vehicle having notified the work vehicle of dirt. Alternatively, after a work vehicle has recognized that dirt is sticking to itself by notification from another work vehicle, the work vehicle can clean itself by discharging water stored in its own water storage tank against itself. In this case, the work vehicle can clean itself by vertically discharging water upward and receiving the discharged water.

In the first embodiment, wireless communication is mainly assumed as communication between work vehicles. However, wired communication using wired connection may also be used.

Also, an example in which guidance is performed by transmitting a guidance instruction has been explained. However, it is also possible to install a towing mechanism in each work vehicle, and physically tow another work vehicle by using this towing mechanism, thereby guiding the other work vehicle to the installation position of the cleaning apparatus.

Furthermore, an example in which a work vehicle performs a series of processes has been explained in the first embodiment, but a server can perform at least some of these processes and notify the processing result. An example is a work system including a plurality of work vehicles, a server (not shown), and the cleaning apparatus. In this system, a first work vehicle transmits a captured image to the server. Then, the server detects dirt on a second work vehicle based on the captured image received from the first work vehicle. If dirt is detected, the server notifies the second work vehicle of dirt information indicating the detection of the dirt. The second work vehicle removes the dirt in response to the notification of the dirt information.

Since the server can perform at least some processes according to the first embodiment, the processing load on each work vehicle can be reduced.

In the first embodiment, an example in which each work vehicle moves to the installation position of the cleaning apparatus and undergoes the cleaning process has been explained. However, the work vehicle need not always undergo the cleaning process. That is, a case in which the cleaning apparatus is out of order or a case in which the cleaning apparatus itself does not exist is possible. By assuming a case like this, it is also possible to cause each work vehicle to return to a predetermined position such as the position of the charging station 300, and keep the work vehicle waiting while displaying an error. A user having found the work vehicle waiting in the predetermined position can recognize that the work vehicle requires cleaning. Alternatively, the occurrence of an error can be transmitted to a communication terminal (not shown) of the user.

This makes it unnecessary to visually check dirt sticking to the work vehicle, and facilitates the work of removing dirt. Thus, even when using a work vehicle in an environment in which no cleaning apparatus exists, the convenience of (manual) cleaning by the user can be improved.

Second Embodiment

In the first embodiment, an example in which a work vehicle to which dirt is sticking moves to the installation position of the cleaning apparatus in accordance with guidance by a normal work vehicle or by autonomous traveling and undergoes the cleaning process based on the dirt checking operation between the work vehicles has been explained. In this embodiment, however, an example in which one work vehicle singly checks dirt on the self-vehicle and undergoes the cleaning process if there is dirt will be explained.

FIG. 14 is a view showing the way of cleaning of a work vehicle according to this embodiment. A work vehicle 10a has dirt sticking not to a camera unit 11 but to the body. That is, the work vehicle 10a is capable of autonomous traveling but has dirt on the body.

A cleaning apparatus 350 according to this embodiment is almost similar to the cleaning apparatus 350 explained with reference to FIG. 4, but has a mirror surface 1401. The work vehicle 10a having stopped in a predetermined position of the cleaning apparatus 350 captures an image of the mirror surface 1401. The work vehicle 10a determines whether dirt is sticking to itself based on a captured image 1402. If it is determined that dirt is sticking, the work vehicle 10a transmits dirt information indicating the detection of dirt to the cleaning apparatus 350. In response to the reception of the dirt information, the cleaning apparatus 350 performs a cleaning process by discharging water 352a and water 352b from water discharge ports 351a and 351b.

According to this embodiment as explained above, even when one work vehicle performs a work, the work vehicle can detect dirt on itself and undergo the cleaning process.

Other Embodiments

The present invention can also be implemented by supplying a program for implementing one or more functions explained in each embodiment to a system or an apparatus via a network or a storage medium, and reading out and executing the program by one or more processors in a computer of the system or the apparatus. It is also possible to implement the present invention by such a mode.

Summary of Embodiments

Arrangement 1. A work system of the above embodiment is a work system comprising a first autonomous work machine (for example, 10b) and a second autonomous work machine (for example, 10a), wherein the first autonomous work machine includes a detection unit (for example, 44a) configured to detect dirt on the second autonomous work machine, and a notification unit (for example, 44a) configured to, if the detection unit detects dirt, notify the second autonomous work machine of dirt information indicating the detection of the dirt, and the second autonomous work machine removes the dirt or waits in a predetermined position in response to the notification of the dirt information by the notification unit.

This makes it possible to perform processes such as a process of automatically removing dirt or a process of returning to a predetermined position such as a station and waiting while displaying an error. A user who has found a work machine waiting in the predetermined position can recognize that the work machine requires cleaning. This facilitates the work of removing dirt because it is unnecessary to visually check dirt sticking to the work machine.

Arrangement 2. In the work system of the above embodiment,
the first autonomous work machine further includes an image capturing unit (for example, 11), and
the detection unit detects dirt based on a result of capturing an image of the second autonomous work machine by the image capturing unit of the first autonomous work machine.

Since dirt can be detected by using the result of image capturing by the camera unit for use in autonomous traveling, one image capturing result can be used in a plurality of purposes.

Arrangement 3. In the work system of the above embodiment, the detection unit detects dirt on a sensor unit (for example, a camera or a LIDAR irradiation unit) of the second autonomous work machine, based on the result of capturing an image of the second autonomous work machine by the image capturing unit of the first autonomous work machine.

According to this embodiment, dirt on the sensor unit (for example, a camera or a LIDAR irradiation unit), which is difficult to detect or cannot be detected by the self-machine, can be detected by another machine. This can reduce overlooking of dirt.

Arrangement 4. In the work system of the above embodiment,
the second autonomous work machine includes
a determination unit (for example, 44a) configured to determine whether autonomous traveling is possible, and
a control unit (for example, 44a) configured to, if the determination unit determines that autonomous traveling is possible, move the second autonomous work machine to an installation position of a cleaning apparatus or the predetermined position, and
the second autonomous work machine removes the dirt by undergoing a cleaning process by the cleaning apparatus.

Even when dirt is sticking to the work machine, therefore, the work machine can move to the cleaning apparatus and undergo the cleaning process by itself if the work machine is capable of autonomous traveling.

Arrangement 5. In the work system of the above embodiment,
the second autonomous work machine further includes a requesting unit (for example, 44a) configured to, if the determination unit determines that autonomous traveling is impossible, request the first autonomous work machine to guide the second autonomous work machine to the installation position of the cleaning apparatus or the predetermined position,
the first autonomous work machine further includes a guiding unit (for example, 44a) configured to guide the second autonomous work machine to the installation position of the cleaning apparatus or the predetermined position in response to the request by the requesting unit, and
the control unit of the second autonomous work machine moves the second autonomous work machine to the installation position of the cleaning apparatus or the predetermined position in accordance with the guidance by the guiding unit.

Accordingly, even when dirt is sticking and autonomous traveling is impossible, the work machine can move to the cleaning apparatus in accordance with the guidance by another work machine and undergo the cleaning process.

Arrangement 6. In the work system of the above embodiment, the guiding unit of the first autonomous work machine regularly notifies the second autonomous work machine of first position information indicating a position of the first autonomous work machine, and guides the second autonomous work machine such that the second autonomous work machine moves to the position indicated by the first position information, and the first autonomous work machine further includes a control unit configured to move the first autonomous work machine to the installation position of the cleaning apparatus or the predetermined position while performing the guidance by the guiding unit.

As described above, the work machine that performs guidance moves to the installation position of the cleaning apparatus while notifying the guidance target work machine of the position information of the self-machine. Therefore, the guidance target work machine can recognize a rough position and hence can move toward the installation position of the cleaning apparatus.

Arrangement 7. In the work system of the above embodiment, the guiding unit of the first autonomous work machine calculates second position information indicating a position of the second autonomous work machine, based on information indicating a position and a direction of the first autonomous work machine, and information on a distance from the first autonomous work machine to the second autonomous work machine, and regularly notifies the second autonomous work machine of the second position information, and the control unit of the second autonomous work machine moves the second autonomous work machine to the installation position of the cleaning apparatus or the predetermined position based on the second position information regularly notified from the first autonomous work machine.

As described above, the work machine that performs guidance calculates the position information of the guidance target work machine, and notifies the guidance target work machine of the calculated position information. Therefore, the guidance target work machine can accurately recognize its position and hence can move toward the installation position of the cleaning apparatus.

Arrangement 8. In the work system of the above embodiment, the second autonomous work machine further includes an image capturing unit (for example, 11), and the determination unit of the second autonomous work machine determines whether autonomous traveling is possible, based on a degree of dirt on the image capturing unit of the second autonomous work machine.

Accordingly, if appropriate distance information is difficult to obtain such as a case in which no good image capturing result can be obtained, it is possible to suppress departure from the work area caused by the continuation of autonomous traveling.

Arrangement 9. In the work system of the above embodiment, the notification unit notifies the second autonomous work machine of the dirt information by passing light.

Consequently, the dirt information can be transmitted even when wireless communication has a problem.

Arrangement 10. In the work system of the above embodiment, the second autonomous work machine further includes a check asking unit (for example, 44*a*) configured to, if the first autonomous work machine exists in a predetermined distance range, ask the first autonomous work machine to perform a checking work for checking whether the second autonomous work machine is dirty, and a receiving unit (for example, 44*a*, 35) configured to receive response information indicating that the checking work can be performed, from the first autonomous work machine, and the control unit of the second autonomous work machine tunes the second autonomous work machine in order to perform the checking work, if the response information indicating that the checking work can be performed is received.

Accordingly, a plurality of work machines can confirm the presence/absence of dirt over the whole circumference of each machine.

Arrangement 11. A work system of the above embodiment is a work system comprising a first autonomous work machine, a second autonomous work machine, and a server, wherein the first autonomous work machine includes a transmitting unit configured to transmit a captured image to the server, the server includes:

a detection unit configured to detect dirt on the second autonomous work machine based on the captured image received from the first autonomous work machine; and a notification unit configured to, if the detection unit detects dirt, notify the second autonomous work machine of dirt information indicating the detection of the dirt, and the second autonomous work machine removes the dirt or waits in a predetermined position in response to the notification of the dirt information by the notification unit.

According to this embodiment, the server can detect dirt on the work machine. This can reduce the processing load on the work machine.

Arrangement 12. An autonomous work machine (for example, 10*b*) of the above embodiment comprises an image capturing unit (for example, 11), a detection unit (for example, 44*a*) configured to detect dirt on another autonomous work machine (for example, 10*a*) based on a result of image capturing by the image capturing unit, a notification unit (for example, 44*a*, 35) configured to, if the detection unit detects dirt, notify the other autonomous work machine of dirt information indicating the detection of the dirt, and a guiding unit (for example, 44*a*) configured to guide the other autonomous work machine having received the dirt information to an installation position of a cleaning apparatus or a predetermined position, in response to a request from the other autonomous work machine.

Consequently, it is possible to notify another work machine of the sticking of dirt. In addition, if the other work machine is incapable of autonomous traveling, the other work machine can undergo the cleaning process by being guided to the installation position of the cleaning apparatus.

Arrangement 13. An autonomous work machine (for example, 10*a*) of the above embodiment comprises a receiving unit (for example, 44*a*, 35) configured to receive dirt information indicating that dirt on the autonomous work machine is detected, from another autonomous work machine (for example, 10b), a determination unit (for example, 44a) configured to determine whether the autonomous work machine is capable of autonomous traveling, in response to the reception of the dirt information, a requesting unit (for example, 44a) configured to request the other autonomous work machine to guide the autonomous work machine to an installation position of a cleaning apparatus or a predetermined position, if the determination unit determines that autonomous traveling is impossible, and a control unit (for example, 44a) configured to move the autonomous work machine to the installation position of the cleaning apparatus or the predetermined position in accordance with the guidance by the other autonomous work machine.

Accordingly, the work machine can recognize that dirt is sticking to it. Also, even when the work machine is incapable of autonomous traveling, the work machine can clean itself because it can move to the cleaning apparatus by being guided by another work machine.

Arrangement 14. A method of controlling an autonomous work machine (for example, 10b) of the above embodiment is a method of controlling an autonomous work machine including an image capturing unit (for example, 11), comprising detecting dirt on another autonomous work machine (for example, 10a) based on a result of image capturing by the image capturing unit, if dirt is detected in the detecting, notifying the other autonomous work machine of dirt information indicating the detection of the dirt, and guiding the other autonomous work machine having received the dirt information to an installation position of a cleaning apparatus or a predetermined position, in response to a request from the other autonomous work machine.

Accordingly, it is possible to notify another work machine of the sticking of dirt. In addition, if the other work machine is incapable of autonomous traveling, the other work machine can undergo the cleaning process by being guided to the installation position of the cleaning apparatus, Arrangement 15. A method of controlling an autonomous work machine (for example, 10a) of the above embodiment comprises receiving dirt information indicating that dirt on the autonomous work machine is detected, from another autonomous work machine (for example, 10b), determining whether the autonomous work machine is capable of autonomous traveling, in response to the reception of the dirt information, requesting the other autonomous work machine to guide the autonomous work machine to an installation position of a cleaning apparatus or a predetermined position, if it is determined in the determining that autonomous traveling is impossible, and moving the autonomous work machine to the installation position of the cleaning apparatus or the predetermined position in accordance with the guidance by the other autonomous work machine.

Accordingly, the work machine can recognize that dirt is sticking to it. Also, even when the work machine is incapable of autonomous traveling, the work machine can clean itself because it can move to the cleaning apparatus by being guided by another work machine.

Arrangement 16. A non-transitory computer-readable storage medium of the above embodiment is a non-transitory computer-readable storage medium storing program for causing a computer to function as an autonomous work machine of the above embodiment.

This embodiment can implement an autonomous work machine of the above embodiment by a computer.

According to the present invention, it is possible to perform processes such as a process of automatically removing dirt or a process of returning to a predetermined position such as a station and waiting while displaying an error. A user who has found a work machine waiting in the predetermined position can recognize that the work machine requires cleaning. This facilitates the work of removing dirt because it is unnecessary to visually check dirt sticking to the work machine.

The invention is not limited to the foregoing embodiments, and various variations/changes are possible within the spirit of the invention.

What is claimed is:

1. A work system comprising a first autonomous work machine and a second autonomous work machine, wherein the first autonomous work machine includes:
  a detection unit configured to detect dirt on the second autonomous work machine; and
  a notification unit configured to, if the detection unit detects dirt, notify the second autonomous work machine of dirt information indicating the detection of the dirt, and
  the second autonomous work machine removes the dirt or waits in a predetermined position in response to the notification of the dirt information by the notification unit.

2. The system according to claim 1, wherein
  the first autonomous work machine further includes an image capturing unit, and
  the detection unit detects dirt based on a result of capturing an image of the second autonomous work machine by the image capturing unit of the first autonomous work machine.

3. The system according to claim 2, wherein the detection unit detects dirt on a sensor unit of the second autonomous work machine, based on the result of capturing an image of the second autonomous work machine by the image capturing unit of the first autonomous work machine.

4. The system according to claim 1, wherein
  the second autonomous work machine includes:
  a determination unit configured to determine whether autonomous traveling is possible; and
  a control unit configured to, if the determination unit determines that autonomous traveling is possible, move the second autonomous work machine to an installation position of a cleaning apparatus or the predetermined position, and
  the second autonomous work machine removes the dirt by undergoing a cleaning process by the cleaning apparatus.

5. The system according to claim 4, wherein
  the second autonomous work machine further includes a requesting unit configured to, if the determination unit determines that autonomous traveling is impossible, request the first autonomous work machine to guide the second autonomous work machine to the installation position of the cleaning apparatus or the predetermined position,
  the first autonomous work machine further includes a guiding unit configured to guide the second autonomous work machine to the installation position of the cleaning apparatus or the predetermined position in response to the request by the requesting unit, and the control unit of the second autonomous work machine moves the second autonomous work machine to the installation position of the cleaning apparatus or the predetermined position in accordance with the guidance by the guiding unit.

6. The system according to claim 5, wherein
the guiding unit of the first autonomous work machine regularly notifies the second autonomous work machine of first position information indicating a position of the first autonomous work machine, and guides the second autonomous work machine such that the second autonomous work machine moves to the position indicated by the first position information, and
the first autonomous work machine further includes a control unit configured to move the first autonomous work machine to the installation position of the cleaning apparatus or the predetermined position while performing the guidance by the guiding unit.

7. The system according to claim 6, wherein
the guiding unit of the first autonomous work machine calculates second position information indicating a position of the second autonomous work machine, based on information indicating a position and a direction of the first autonomous work machine, and information on a distance from the first autonomous work machine to the second autonomous work machine, and regularly notifies the second autonomous work machine of the second position information, and
the control unit of the second autonomous work machine moves the second autonomous work machine to the installation position of the cleaning apparatus or the predetermined position based on the second position information regularly notified from the first autonomous work machine.

8. The system according to claim 4, wherein
the second autonomous work machine further includes an image capturing unit, and
the determination unit of the second autonomous work machine determines whether autonomous traveling is possible, based on a degree of dirt on the image capturing unit of the second autonomous work machine.

9. The system according to claim 4, wherein
the second autonomous work machine further includes:
a check asking unit configured to, if the first autonomous work machine exists in a predetermined distance range, ask the first autonomous work machine to perform a checking work for checking whether the second autonomous work machine is dirty; and
a receiving unit configured to receive response information indicating that the checking work can be performed, from the first autonomous work machine, and
the control unit of the second autonomous work machine turns the second autonomous work machine in order to perform the checking work, if the response information indicating that the checking work can be performed is received.

10. The system according to claim 1, wherein the notification unit notifies the second autonomous work machine of the dirt information by passing light.

11. A work system comprising a first autonomous work machine, a second autonomous work machine, and a server, wherein
the first autonomous work machine includes a transmitting unit configured to transmit a captured image to the server,
the server includes:

a detection unit configured to detect dirt on the second autonomous work machine based on the captured image received from the first autonomous work machine; and
a notification unit configured to, if the detection unit detects dirt, notify the second autonomous work machine of dirt information indicating the detection of the dirt, and
the second autonomous work machine removes the dirt or waits in a predetermined position in response to the notification of the dirt information by the notification unit.

12. An autonomous work machine comprising:
an image capturing unit;
a detection unit configured to detect dirt on another autonomous work machine based on a result of image capturing by the image capturing unit;
a notification unit configured to, if the detection unit detects dirt, notify the other autonomous work machine of dirt information indicating the detection of the dirt; and
a guiding unit configured to guide the other autonomous work machine having received the dirt information to an installation position of a cleaning apparatus or a predetermined position, in response to a request from the other autonomous work machine.

13. A non-transitory computer-readable storage medium storing a program for causing a computer to function as an autonomous work machine cited in claim 12.

14. An autonomous work machine comprising:
a receiving unit configured to receive dirt information indicating that dirt on the autonomous work machine is detected, from another autonomous work machine;
a determination unit configured to determine whether the autonomous work machine is capable of autonomous traveling, in response to the reception of the dirt information;
a requesting unit configured to request the other autonomous work machine to guide the autonomous work machine to an installation position of a cleaning apparatus or a predetermined position, if the determination unit determines that autonomous traveling is impossible; and
a control unit configured to move the autonomous work machine to the installation position of the cleaning apparatus or the predetermined position in accordance with the guidance by the other autonomous work machine.

15. A non-transitory computer-readable storage medium storing a program for causing a computer to function as an autonomous work machine cited in claim 14.

16. A method of controlling an autonomous work machine including an image capturing unit, comprising:
detecting dirt on another autonomous work machine based on a result of image capturing by the image capturing unit;
if dirt is detected in the detecting, notifying the other autonomous work machine of dirt information indicating the detection of the dirt; and
guiding the other autonomous work machine having received the dirt information to an installation position of a cleaning apparatus or a predetermined position, in response to a request from the other autonomous work machine.

17. A method of controlling an autonomous work machine, comprising:

receiving dirt information indicating that dirt on the autonomous work machine is detected, from another autonomous work machine;

determining whether the autonomous work machine is capable of autonomous traveling, in response to the reception of the dirt information;

requesting the other autonomous work machine to guide the autonomous work machine to an installation position of a cleaning apparatus or a predetermined position, if it is determined in the determining that autonomous traveling is impossible; and moving the autonomous work machine to the installation position of the cleaning apparatus or the predetermined position in accordance with the guidance by the other autonomous work machine.

* * * * *